3,260,669
CORROSION INHIBITING COMPOSITION FOR USE IN OIL WELL FLUIDS
William Schoen, Houston, Tex., assignor to Texaco Inc., New York, N.Y., a corporation of Delaware
No Drawing. Filed June 14, 1963, Ser. No. 287,792
3 Claims. (Cl. 252—8.55)

The instant invention pertains to novel corrosion inhibiting compositions and to a method of inhibiting the corrosion of metals in contact with corrosive substances. More particularly the invention relates to the protection of metal apparatus from the corrositivty of petroliferous well fluids in contact therewith containing carbon dioxide, hydrogen sulfide, and/or organic acids.

In oil and gas condensate fields, the production of petroliferous fluids from subsurface formations is often accompanied by extremely severe corrosion of metal apparatus contacting the fluids produced. In some instances, it is found that the fluids contain substantial amounts of organic acids and/or carbon dioxide which form carbonic acids. These fluids are classified in the petroleum art as "sweet." In other cases, the fluids include sulfides such as alkali metal sulfide, alkaline earth metal sulfide, acid sulfide, hydrogen sulfide and/or organic sulfides. The sulfide containing fluids are designated as "sour."

It is accordingly an object of this invention to provide improved corrosion inhibiting compositions which are effective in minimizing and reducing corrosion in wells producing oil-brine mixtures.

Another object is to provide a method of substantially inhibiting corrosion of ferrous metals in contact with well fluids.

More specifically, I have found that the combination of a 2-alkylpiperazine and dimerized fatty acid when dissolved or dispersed in well fluids function in a synergistic-like manner to inhibit the corrosion of ferrous metals in contact with said fluids. The inhibitor combination is very effective in small amounts and may be introduced directly into the fluid as such. However, it is usually more conveniently employed as a solution in petroleum hydrocarbons or other suitable solvents. As hereinafter explained, the inhibitor combination may also be advantageously employed in conjunction with dispersing agents adapted to promote its uniform dispersion in both the aqueous and oil phase of petroliferous well fluid.

The term "dimerized fatty acid" as employed herein designates a class of dibasic acids formed by polymerizing unsaturated aliphatic hydrocarbon fatty acids containing at least two ethylenic linkages of between about 16 and about 22 carbon atoms to their dimer stage. In the case of linoleic acid, the dimerzation reaction is postulated as follows:

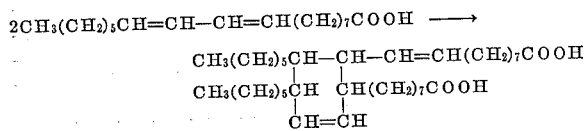

Other acids which dimerize in this manner include linoelaidic linolenic, licanic, arachidonic, clupanodonic, and eleostearic. In general, the polymerization is carried out simply by heating the monomeric acid at an elevated temperature, e.g., about 250° C. while avoiding decarboxylization and cracking. U.S. Patent No. 2,482,761 gives further details. A typical dimerized fatty acid of the type is available commercially from Emery Industries, Inc. under the trade name Empol 1014. Such a product is obtained by dimerizing linoleic acid derived from vegetable oils, e.g., soya oil, linseed oil, and corn oil. Empol 1014 is a viscous liquid containing 95 wt. percent dilinoleic acid, about 4 wt. percent trilinoleic acid and about 1 wt. percent of linoleic acid. Empol 1014 has a neutralization equivalent weight of about 290 and an acid value of about 193.

The 2-alkylpiperazine component of the inhibitor combination may be represented by the generic formula:

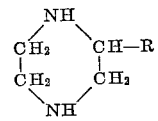

where R is a saturated aliphatic radical (alkyl) of from 1 to 18 carbons. Examples of the alkylpiperazines contemplated herein are 2-methylpiperazine, 2-ethylpiperazine, 2-isopropylpiperazine, and 2-dodecylpiperazine.

The inhibitor combination may be formed by simple mixing of the dimerized acid and alkylpiperazine. Since both these materials are normally solids at room temperature, inert organic liquid diluent is preferably employed in the formulation not only to facilitate mixing of the components but also to serve as vehicle for the inhibitor combination once formed. Relatively high boiling petroleum hydrocarbons, e.g., kerosene, lubricating oil, are preferred for such purposes. Other examples of inert diluent solvents that may be employed are toluene, xylene, benzene, ethyl alcohol, and isopropyl alcohol.

The weight ratio of dimerized acid to alkylpiperazine in the inhibitor combination is advantageously between about 10:1 and 1:10 although higher and lower weight ratios may be employed. Further, when the inhibitor combination is dispersed or dissolved in an inert organic liquid diluent, i.e., in the form of a liquid concentrate, said combination is advantageously present in said concentrate in an amount between about 1 and 70 wt. percent.

The novel inhibitor combination and concentrate solutions thereof are added to corrosive well fluids in the ways known to the art. For example, if the inhibitor combination is to be applied to an oil well or a pipeline in which the oil to water ratio is high it is advisable to introduce the inhibitor combination in a form readily dispersible in oil. A convenient form for the purpose is a solution of the inhibitor combination in oil or other inert hydrocarbon solvent. In respect to oil and gas wells the solution will be poured down the annular space between the casing and the tubing string. As to pipelines the inhibitor can be injected at various points along the length thereof. The undiluted inhibitor may be introduced in the same manner, but in order to insure proper mixing with well fluids, solvent solutions containing 1–70 wt. percent of the inhibitor are properly employed. Although petroleum oils are the most economical diluents for the inhibitor, other solvents which are themselves oil soluble may also be employed. A few examples of such solvents are kerosene, benzene, methyl alcohol, ethyl alcohol and isopropyl alcohol.

Another method of addition of the inhibitor combination to the corrosive well fluid is adding the inhibitor combination in the form of weighted and disintegratable stick. Such a stick is formed by mixing the inhibitor combination with an oil soluble or water soluble binder in a weighted compound such as barium sulfate or lead oxide. The stick is dropped into the oil or gas well tube where solution or emulsification occurs. A few examples of oil soluble binders are paraffin waxes and asphalt. Some examples of water soluble binders include gelatin, solid polyhydric alchols, sugar and water soluble gums.

When the inhibitor combination is to be applied to systems in which the corrosive fluid is predominantly water or brine, a water dispersible form of the inhibitor combination is preferred. This form could be obtained by forming solid sticks of inhibitor with a water soluble binder and weighted compound or by emulsifying the inhibitor in water through the use of suitable emulsifying agents such as polyoxyethylene, anhydrosorbitol monooleate containing approximately 20 oxyethylene groups per molecule. This emulsifier is available under the trademark "Tween 80."

Although the amount of inhibitor combination employed in corrosive well fluids is dependent on intensity of corrosive conditions and degree of protection desired, normally between about 10 and 30,000 p.p.m. of inhibitor combination based on the corrosive well fluid mixture is utilized.

The following examples further illustrate the invention but are not to be constructed as limitations thereof.

EXAMPLE I

This example illustrates the preparation of a concentrate of one of the inhibitor combinations of the invention.

To 100 mls. of isopropyl alcohol there was added 0.77 gram of 2-methylpiperazine and 2.90 grams of Empol 1014 (about 95 wt. percent dilinoleic acid, about 4 wt. percent trilinoleic acid and 1 wt. percent linoleic acid). The resultant mixture was stirred at room temperature for several minutes to produce a solution.

EXAMPLE II

The following corrosion tests demonstrated the effectiveness of the novel inhibitor combination in suppressing corrosion of ferrous metals in contact with corrosive well fluids.

Persistent protection test

To a four ounce bottle, there is added 100 milliliters (mls.) of test mixture (oil-brine exposure fluid). The test mixture is prepared by combining 90 mls. of synthetic brine (aqueous solution containing 10 wt. percent sodium chloride and 0.5 wt. percent calcium chloride) and 10 mls. of a lubricating oil having a kinematic viscosity at 100° F. of about 4.5 centistokes and an API gravity of about 37°. The inhibitors to be tested are included in the oil phase as an isopropanol solution. One milliliter of 6 wt. percent aqueous acetic acid is then added to each bottle prior to sweetening or souring together with a weighed polished steel coupon of 3″ x ⅜″ x 5 mils dimension. To simulate the "sweet" systems, the fluids in the bottle were saturated with carbon dioxide gas at room temperature. Hydrogen sulfide was used as the saturating gas for simulating "sour" systems. In any case, the bottle was stoppered to maintain the carbon dioxide or hydrogen sulfide atmosphere. The stoppered bottle was then tumbled on the wheel for one hour period. After rinsing, the test coupon was again placed into fresh oil-brine exposure fluid minus the inhibitor and tumbled on the wheel for a three day period at 122° F. The test coupon was then removed, rinsed successively with water and acetone, dried and reweighed.

Continuous protection test

The continuous protection procedure modifies the persistent protection method to the extent that the test coupon is subjected to only one rotating wheel treatment, i.e., rotating the bottle containing the insulated coupon in the inhibited oil-brine solution for a three day period at 122° F. In other words the inhibitor filming and metal rinsing stages of the persistent protection test are deleted.

The inhibitors tested are described below.

| Designation: | Description |
|---|---|
| 2–MP+E–1014 | 2-methylpiperazine+Empol 1014. |
| 2–MP+OA | 2-methylpiperazine+oleic acid. |
| 2–MP | 2-methylpiperazine. |
| E–1014 | Empol 1014. |
| OA | Oleic acid. |

In the following Table I, there is found a compilation of the corrosion data and test results:

TABLE I

| Inhibitor, wt. percent in isopropanol solution | Test | Test Conditions | Isopropanol Solution Conc. in Exposure Fluid in 10,000 p.p.m. | Percent Corrosion Inhibition |
|---|---|---|---|---|
| 3.5% E–1014+ 0.93% 2–MP. | Continuous | Sour | 4.5–26 | 79–85 |
| 0.93% 2–MP | do | do | 4.5–26 | *–18 to +17 |
| 3.5% E–1014 | do | do | 4.5–26 | 8–12 |
| 19% E–1014+5.1% 2–MP. | Persistent | Sweet | 1–32 | 63–92 |
| 5.1% 2–MP | do | do | 16 | 19 |
| 19% E–1014 | do | do | 16 | 18 |
| 19% E–1014+5.1% 2–MP. | do | Sour | 8–32 | 87–96 |
| 5.1% 2–MP | do | do | 16 | 0 |
| 19% E–1014 | do | do | 16 | 3 |
| 5.1% OA+0.92% 2–MP. | do | Sweet | 16 | 7 |
| 0.92% 2–MP | do | do | 16 | 15 |
| 5.1% OA | do | do | 16 | *–18 |
| 5.1% OA+0.92% 2–MP. | do | Sour | 16 | 7 |
| 0.92% 2–MP | do | do | 16 | *–4 |
| 5.1% OA | do | do | 16 | 23 |

* Test Coupon gained weight.

As can be seen from the above data, the alkylpiperazine-dimer acid inhibitor combination is substantially more effective in reducing corrosion than equivalent amounts of its component parts, establishing that the corrosion inhibition action of the combination is not merely the additive effect of its components but rather a synergistic effect. It can also be seen from the data under persistent test conditions that the oleic acid-alkylpiperazine inhibitor combination was relatively ineffective as an inhibitor emphasizing the unexpectedness of the inhibiting effect of dimer acid-alkylpiperazine combination of the invention.

I claim:

1. A corrosion inhibiting composition for use in oil well fluids consisting essentially of dimerized linoleic acid and 2-methylpiperazine, the weight ratio of said acid to said methylpiperazine being between about 3.5:1.

2. A method for reducing the corrosiveness of oil well fluids towards ferrous metals coming into contact with said fluids comprising mixing said fluids with a corrosion inhibiting amount of a corrosion inhibitor composition consisting essentially of dimerized linoleic acid and 2-methylpiperazine, the weight ratio of said acid to said methylpiperazine being about 3.5:1.

3. A method in accordance with claim 2 wherein said corrosion inhibiting amount of said inhibitor in said well fluid is at least about 10 p.p.m.

(References on following page)

References Cited by the Examiner

UNITED STATES PATENTS

| | | | |
|---|---|---|---|
| 2,111,253 | 3/1938 | Stoesser et al. | 252—390 |
| 2,756,211 | 7/1956 | Jones | 252—8.55 |
| 2,763,612 | 9/1956 | Raifsnider et al. | 252—8.55 |
| 3,017,354 | 1/1962 | Riggs | 252—8.55 |
| 3,046,277 | 7/1962 | Anslow | 252—392 |
| 3,061,553 | 10/1962 | Riggs | 252—8.55 |
| 3,089,854 | 5/1963 | Meyers et al. | 252—392 |
| 3,167,554 | 1/1965 | Ernst | 252—390 |

ALBERT T. MEYERS, *Primary Examiner.*

JULIUS GREENWALD, *Examiner.*

H. B. GUYNN, *Assistant Examiner.*